US012783767B2

(12) United States Patent
Mitra et al.

(10) Patent No.: US 12,783,767 B2
(45) Date of Patent: Nov. 3, 2026

(54) GENERALIZED QED PRE-SILICON VERIFICATION FRAMEWORK

(71) Applicant: The Board of Trustees of the Leland Stanford Junior University, Stanford, CA (US)

(72) Inventors: Subhasish Mitra, Palo Alto, CA (US); Clark Barrett, Palo Alto, CA (US); Caroline J. Trippel, Palo Alto, CA (US); Saranyu Chattopadhyay, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 521 days.

(21) Appl. No.: 18/541,722

(22) Filed: Dec. 15, 2023

(65) Prior Publication Data

US 2025/0200258 A1 Jun. 19, 2025

(51) Int. Cl.
*G06F 30/33* (2020.01)
*G06F 115/02* (2020.01)

(52) U.S. Cl.
CPC .......... *G06F 30/33* (2020.01); *G06F 2115/02* (2020.01)

(58) Field of Classification Search
CPC ........................................................ G06F 30/33
USPC ........................................................... 716/106
See application file for complete search history.

(56) References Cited

U.S. PATENT DOCUMENTS

2018/0157574 A1* 6/2018 Mitra .................. G06F 11/3079

OTHER PUBLICATIONS

Burch, J.R. et al., “Automatic Verification of Pipelined Microprocessor Control,” CAV ’94: Proceedings of the 6th International Conference on Computer Aided Verification, Jun. 21-23, 1994, Springer, pp. 68-80.

Chattopadhyay, S. et al., “Scaling Up Hardware Accelerator Verification using A-QED with Functional Decomposition,” Proceedings of the 21st Formal Methods in Computer-Aided Design (FMCAD 2021), Oct. 18-22, 2021, IEEE, 2021, pp. 42-52.

Chen, W. et al., “Challenges and Trends in Modem SoC Design Verification,” IEEE Design & Test, vol. 34, No. 5, Oct. 2017, first published Aug. 2017, IEEE, pp. 7-22.

(Continued)

*Primary Examiner* — Eric D Lee

(74) *Attorney, Agent, or Firm* — Withrow & Terranova, PLLC

(57) ABSTRACT

Systems and methods of verifying a hardware processing circuit design for a digital system are disclosed. Three different computer models of the same hardware are implemented. The first computer model is implemented on a first sequence of action inputs and a second sequence of action inputs. The second computer model is implemented on the first sequence of action inputs and is allowed to idle until the first sequence is done. The architectural states of the second computer model are then recorded. The third computer model is implemented on the second sequence after having set the third computer model to the recorded architectural states. The outputs of the first computer model and the third computer model are implemented to check for functional consistency. The techniques described herein can be used to check digital designs for functional consistency, are sound and complete, and do not require an understanding of implementation details.

20 Claims, 4 Drawing Sheets

(56) References Cited

OTHER PUBLICATIONS

Clarke, E. et al., "Bounded Model Checking Using Satisfiability Solving," Formal Methods in System Design, vol. 19, No. 1, Jul. 2001, pp. 7-34.
Cross, J., "A14 Bionic FAQ: What you need to know about Apple's 5nm processor," Macworld, Oct. 14, 2020, available from the Internet: [URL: https://www.macworld.com/article/234595/a14-bionic-faq-performance-features-cpu-gpu-neural-engine.html].
Devarajegowda, K. et al., "Gap-free Processor Verification by S2QED and Property Generation," 2020 Design, Automation & Test in Europe Conference & Exhibition (Date), Mar. 9-13, 2020, Grenoble, France, IEEE, pp. 526-531.
Devarajegowda, K. et al., "Python Based Framework for HDSLs with an Underlying Formal Semantics," 2017 IEEE/ACM International Conference on Computer-Aided Design (ICCAD), Nov. 13-16, 2017, Irvine, CA, USA, IEEE, pp. 1019-1025.
Fadiheh, M.R. et al., "Processor Hardware Security Vulnerabilities and Their Detection by Unique Program Execution Checking," 2019 Design, Automation & Test in Europe Conference & Exhibition (Date), Mar. 25-29, 2019, Florence, Italy, IEEE, pp. 994-999.
Fadiheh, M.R. et al., "Symbolic Quick Error Detection using Symbolic Initial State for Pre-silicon Verification," 2018 Design, Automation & Test in Europe Conference & Exhibition (Date), Mar. 19-23, 2018, Dresden, Germany, IEEE, pp. 55-60.
Foster, H.D., "Trends in Functional Verification: A 2014 Industry Study," 2015 52nd ACM/EDAC/IEEE Design Automation Conference (DAC), Jun. 8-12, 2015, San Francisco, CA, USA, IEEE, 13 pages.
Huang, B.-Y et al., "Instruction-Level Abstraction (ILA): A Uniform Specification for System-on-Chip (SoC) Verification," ACM Transactions on Design Automation of Electronic Systems, vol. 24, Issue 1, Article No. 10, pp. 1-24.
Ieee, "IEEE Standard for Universal Verification Methodology Language Reference Manual," IEEE Std 1800.2-2017, approved Feb. 14, 2017, IEEE Computer Society, 472 pages.
Jones, R.B. et al., "Self-consistency Checking," International Conference on Formal Methods in Computer-Aided Design (FMCAD 1996), Nov. 1996, Palo Alto, CA, USA, Springer, 13 pages.
Keller, R.M., "Formal Verification of Parallel Programs," Communications of the ACM, vol. 19, No. 7, Jul. 1976, pp. 371-384.
Lonsing, F. et al., "A Theoretical Framework for Symbolic Quick Error Detection," 2020 Formal Methods in Computer Aided Design (FMCAD), Jun. 2020, TU Wien Academic Press, 10 pages.
Norrie, T. et al., "The Design Process for Google's Training Chips: TPUv2 and TPUv3," IEEE Micro, vol. 41, Issue 2, Mar.-Apr. 2021, first published Feb. 2021, IEEE, 10 pages.
Peccerillo, B. et al., "A Survey on Hardware Accelerators: Taxonomy, Trends, Challenges, and Perspectives," Journal of Systems Architecture, vol. 129, Aug. 2022, Elsevier, 51 pages.
Reid, A. et al., "End-to-End Verification of ARM® Processors with ISA-Formal," International Conference on Computer Aided Verification (CAV 2016), Jul. 17-23, 2016, Toronto, Canada, Springer, pp. 42-58.
Singh et al., "A-QED Verification of Hardware Accelerators," 57th ACM/IEEE Design Automation Conference (DAC 2020), Jul. 20-24, 2020, San Francisco, CA, IEEE, 6 pages.
Singh, E. et al., "Logic Bug Detection and Localization Using Symbolic Quick Error Detection," IEEE Transactions on Computer-Aided Design of Integrated Circuits and Systems, May 2018, IEEE, 15 pages.
Singh, E. et al., "Symbolic QED Pre-silicon Verification for Automotive Microcontroller Cores: Industrial Case Study," 2019 Design, Automation & Test in Europe Conference & Exhibition (Date), Mar. 25-29, 2019, Florence, Italy, IEEE, 6 pages.
Wikichip, "A14 Bionic—Apple," Dec. 2022, available from the Internet: [URL: https://en.wikichip.org/wiki/apple/ax/a14#:~:text=The%20A14%20Bionic%20is%20equipped,more%20than%20its%20predecessor%20A13.], 6 pages.
Waterman, A. et al., "The RISC-V Instruction Set Manual, vol. I: User-Level ISA, Version 2.1," Technical Report No. UCB/EECS-2016-118, Electrical Engineering and Computer Sciences University of California at Berkeley, May 31, 2016, available from the Internet: [URL: http://www.eecs.berkeley.edu/Pubs/TechRpts/2016/EECS-2016-118.html], 133 pages.
Zeng, Y. et al., "Generating Architecture-level Abstractions from RTL Designs for Processors and Accelerators Part I: Determining Architectural State Variables," 2021 IEEE/ACM International Conference on Computer Aided Design (ICCAD), Nov. 1-4, 2021, Munich, Germany, IEEE, 9 pages.

* cited by examiner

GENERALIZED QED PRE-SILICON VERIFICATION FRAMEWORK

BACKGROUND

Domain-specific hardware accelerators (HAs) are becoming increasingly crucial for high-throughput and energy-efficient digital systems. Today's digital systems, often referred to as System-on-Chips or SoCs, contain many HAs spanning various application domains. Each HA implements a set of functions referred to as Actions in this paper. HAs may be tightly-coupled, e.g., integrated within a processor's pipeline. More commonly though, HAs are loosely-coupled, interacting with other SoC components (other HAs, processor cores, memory) via on-chip networks. Given their pervasiveness loosely-coupled HAs (LCAs) are the focus of this paper although our presented techniques can be applied to tightly-coupled HAs as well.

Every HA must be verified for correctness both thoroughly and quickly to meet the time-to-market demands of the diverse applications they support. HA formal verification is challenged by: (1) the tremendous effort required to craft highly thorough design-specific properties and full functional specifications, and (2) the scalability of off-the-shelf formal tools. Beyond being time-consuming and error prone producing thorough properties and specifications is an uphill battle due to the rapidly evolving nature of HAs that support rapidly evolving applications.

A recent verification technique, Accelerator Quick Error Detection (A-QED) overcomes the above challenges for a class of HAs that are non-interfering—i.e., HAs that produce the same output for a given action independent of its context within a sequence of actions. A-QED uses formal verification based on Bounded Model Checking (BMC). Unlike conventional BMC-based verification, A-QED does not require extensive design-specific properties or a full functional specification. Instead, A-QED uses self-consistency checks on a given HA. Specifically, A-QED checks for functional Functional consistency (FC), the property that actions with identical inputs always produce the same outputs. While non-interfering HAs readily capture a range of fixed-function designs, interfering HAs are becoming more and more prevalent. This is partly due to the rise of programmable HAs. In fact, traditional processors may be viewed as an extreme case of interfering HAs where each instruction is an HA action. Interfering HAs contain interfering actions whose outputs are dependent on the outputs of other actions, inherently violating A-QED's FC checking. To complicate matters even further, an HA action might read the outputs produced by another action (or write its outputs to be consumed by another action) at clock cycles that depend on the execution of various other concurrent actions active in the HA. Thus, there is an urgent need for a new and general formal verification methodology for interfering (and non-interfering) HAs that preserves the benefits of A-QED (i.e., provably sound and complete verification without requiring extensive design-specific properties or full functional specifications) while reasoning about interfering actions (not possible using A-QED)—a highly difficult challenge.

While non-interfering HAs readily capture a range of fixed-function designs, interfering HAs are becoming more and more prevalent. This is partly due to the rise of programmable HAs. In fact, traditional processors may be viewed as an extreme case of interfering HAs where each instruction is an HA action. Interfering HAs contain interfering actions whose outputs are dependent on the outputs of other actions, inherently violating A-QED's FC checking. To complicate matters even further, an HA action might read the outputs produced by another action (or write its outputs to be consumed by another action) at clock cycles that depend on the execution of various other concurrent actions active in the HA. Thus, there is an urgent need for a new and general formal verification methodology for interfering (and non-interfering) HAs that preserves the benefits of A-QED (i.e., provably sound and complete verification without requiring extensive design-specific properties or full functional specifications) while reasoning about interfering actions (not possible using A-QED)—a highly difficult challenge.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
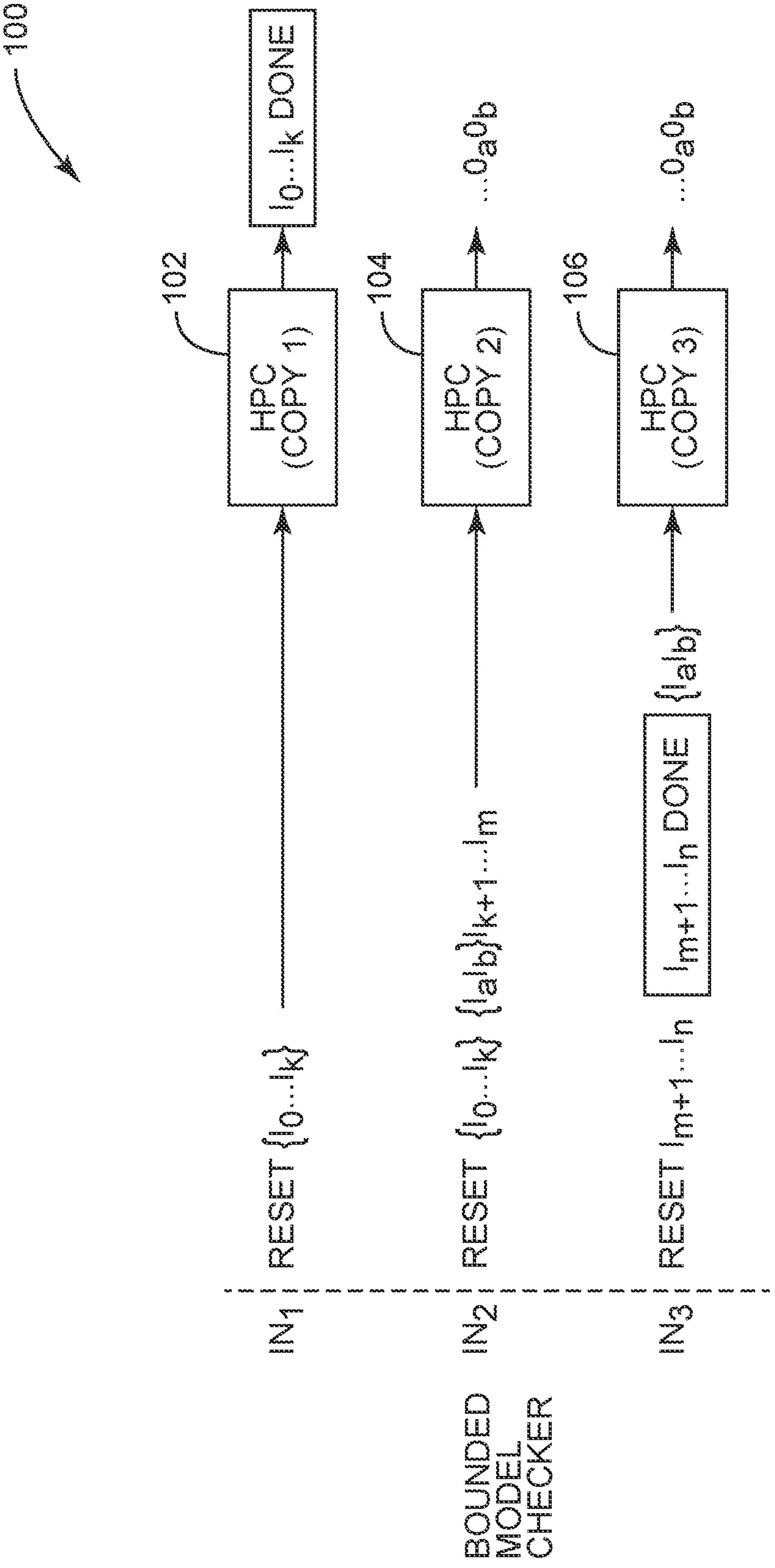
FIG. 1 is a representation of a computer hardware processing circuit (HPC) computer models, inputs provided to each of the HPC computer models, and output generated by the HPC computer models in order to verify an HPC design for a digital system.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a representation of a computer hardware processing circuit (HPC) computer models, inputs provided to each of the HPC computer models, and output generated by the HPC computer models in order to verify an HPC design for a digital system.

The components are utilized by a computer modeling system capable of executing computer models of HPCs in a bounded model checker (BMC). In this manner, computer models are utilized to verify the correctness of a hardware processing circuit design in a pre-silicon environment. Non-limiting examples of a computer modeling system is Very Large Scale Integration (VLSI) and non-limiting examples of the computer models include Register Transfer Level (RTL). Non-limiting examples of HPC designs that can be verified using the techniques disclosed herein include processor cores, hardware accelerators, and/or the like. In some embodiments, methods employed by the components check for functional consistency (FC), the property that actions with identical inputs always produce the same outputs. In addition to FC, the method also performs single-action checking (SAC) and response bound (RB) checking. In some examples, the G-QED techniques described herein are provably sound and complete meaning no bugs are missed and there are no false positives. In some examples, G-QED is not quite general but can verify a large class of digital designs.

In particular, each processing circuit that is being modeled herein is capable of performing a set of functions which are herein referred to as actions. Examples of actions that may be performed herein include updating registers performing addition functions, performing subtraction functions, decoding messages, for performing any other type of definable function that may be implemented by any type of processing circuitry. Processing circuitry can perform interfering actions and non-interfering actions. Non-interfering actions produce the same output independent of the context of the action within a sequence of actions. In other words, non-interfering actions only depend on the current state of independent variables and do not depend on the states of other actions. However, interfering actions have outputs that do depend on the context of the action within the sequence of actions. In other words, the output of an interfering action depends not only on the current state of independent variables but on the state of other actions in the sequence of actions. The components shown in FIG. 1 not only can test for FC of non-interfering actions but can also test for FC of interfering actions.

While the processing circuitry that only performs non-interfering actions can readily capture a range of fixed function designs, processing circuitry that performs interfering actions are becoming more and more prevalent in the industry. This is partly due to the rise of programmable HAs. In fact, traditional processors may be viewed as an extreme case of interfering HAs, where each instruction is an HA action. HAs that perform interfering actions contain interfering actions whose outputs are dependent on the outputs of other actions, thereby significantly complicating FC checks. To complicate matters even further, an HA action might read the outputs produced by another action (or write its outputs to be consumed by another action) at clock cycles that depend on the execution of various other concurrent actions active in the HA. The component shown in FIG. 1 and methodology employed by the components shown in FIG. 1 perform a general formal verification methodology for interfering (and non-interfering) actions. The hardware processing circuit design of a processing circuit is verified in a pre silicon environment with the component shown in FIG. 1.

As shown in FIG. 1, the components include a first computer model 102 of the hardware processing circuitry design, a second computer model 104 of the hardware processing circuitry design, and a third computer model 106 of the hardware processing circuitry design. Thus, the first computer model 102, the second computer model 104, and the third computer model 106 are copies of one another and model the exact same hardware processing circuitry design. In FIG. 1, the first computer model 102, the second computer model 104, and the third computer model 106 modeling the same HPC. However, in other embodiments, the first computer model 102, the second computer model 104, and the third computer model 106 are modeling other types of processing circuitry such as a processing core, processor pipeline circuitry, hardware accelerators, and/or the like.

The components shown in FIG. 1 check for FC to ensure that there is FC regardless of the context for inputs. In FIG. 1, various different combinations of inputs are being implemented by the different computer models 102, 104, 106. In FIG. 1, there is a first sequence of inputs $[I_0 \ldots I_k]$. In this embodiment, the first sequence of action inputs $[I_0 \ldots I_k]$ have k+1 number of elements. In this embodiment, k is equal to at least 1. Since the index for the elements in the first sequence of action inputs $[I_0 \ldots I_k]$ begins at 0, there is more than one input in the first sequence of action inputs $[I_0 \ldots I_k]$. However, in other embodiments, the first sequence of action inputs $[I_0 \ldots I_k]$ may have any integer number of inputs greater than or equal to 1. It should be noted that the first sequence of action inputs is ordered with respect to time so that the first sequence begins at action input $I_0$ and ends at action input $I_k$.

Additionally, there is a second set of action inputs $[I_a, I_b]$, which are also referred to herein as the action pair. It should be noted that the second sequence of action inputs is ordered with respect to time so that the second sequence begins at action input $I_a$ and ends at action input $I_b$. It is the outputs generated by the action pair that are being checked for FC. The second set of action inputs $[I_a, I_b]$ have at least 2 inputs that result in at least one output. In some examples, the second set of action inputs $[I_a, I_b]$ that result in at most two outputs. As explained in further detail below, at least two inputs are used is not all inputs generate an observable output. For example, some non-interfering (or interfering) actions simply update the architectural state of relevant state registers (explained in further detail below). These actions do not generate observable action outputs. Thus, in order to check the action output resulting from a non-interfering action, the non-interfering action should be followed by another action that does generate an observable output. That way the non observable action output of the non-interfering action can be inferred from the observable output of the other action. Thus, the second set of action inputs $[I_a, I_b]$ has at least two members case action $I_a$ and $I_b$ in case action $I_a$ does not generate an observable output.

There are other sequences of action inputs that may be utilized to implement the methodology of the component shown in FIG. 1. For example, FIG. 1 shows sequences of action $[I_{k+1} \ldots I_m]$ and $[I_{m+1} \ldots I_n]$. However, these sequences are not consequential to the methodology for checking FC but rather are ancillary sequences that may be implemented in conjunction with the first sequence and the second sequence.

Each action input defines an action to be taken and one or more variable inputs for the action (i.e., this can be represented as <Action, variable $input_1$ . . . variable $input_x$>). The variable inputs are the inputs needed to perform the action. In some embodiments, at least some of the variable inputs for the action are independent variables. For example, the variable input may be a data field that is updated every clock cycle and that is independent of any other action. If all of the variable inputs for the action are independent variables, the action defined by the action input is a non-interfering action because the action does not depend on any other action. In other embodiments, at least one of the variable inputs is the output of another action. For example, a previous action input may update the architectural state of a relevant state register. One of the variable inputs of the subsequent action may be the architectural state of this relevant state register. In this case, the subsequent action is defined by the subsequent action input as an interfering action because the interfering action depends on the output of the previous action input.

To perform FC, a boundary model checker (BMC) runs the first computer model 102, the second computer model 104, and the third computer model 106. The first computer model 102 is implemented on the first sequence of action inputs [$I_0$ . . . $I_k$]. The first computer model 102 is allowed to idle until the first sequence is done processing the first sequence. After the first computer model 102 is allowed to idle and is done processing the first sequence, the architectural states of the first computer model 102 are recorded. Note, that by allowing the first computer model 102 to idle, determining the exact clock cycle of when the architectural states are updated is unnecessary. Instead, the first computer model 102 is simply allowed to idle and process the first sequence. In some examples, the BMC can symbolically choose all possible [$I_0$ . . . $I_n$], k and n. This means the BMC will exhaustively check FC for all possible values of k, n, for the action inputs [$I_0$ . . . $I_n$] starting with k=1, n=1 and incrementally increasing k and n till the exploration space is too large. In some examples, BMC chooses inputs symbolically. In some examples. G-QED is run on the BMC and in other examples G-QED is run on another software tool with similar functionality.

Once finished, the architectural states of the first computer model 102 are recorded and will be used with the third computer model 106, as explained in further detail below. In some embodiments, at least some of the architectural states that are recorded are the architectural states (i.e., values) of the relevant state registers modeled by the first computer model 102. The architectural states are recorded in a non transitory computer readable medium. Thus, the architectural states are digital representations.

Additionally, the second computer model 104 of the hardware processing design is implemented on the first sequence of action inputs [$I_0$ . . . $I_k$] directly followed by the second sequence of action inputs [$I_a$, $I_b$] what's that the second sequence results in the first action outputs [$O_a$, $O_b$]. The methodology implemented by the components in FIG. 1 are checking the FC of the first action outputs [$O_a$, $O_b$]. In this example, a sequence of action inputs [$I_{k+1}$ . . . $I_m$] directly follow the second sequence of action inputs [$I_a$, $I_b$]. The action outputs of the sequence of action inputs [$I_{k+1}$ . . . $I_m$] are ancillary to the methodology of checking the FC.

In this embodiment, an ancillary sequence of action inputs [$I_{m+1}$ . . . $I_n$] are initially implemented by the third computer model 106. These are ancillary and not relevant to checking FC. Subsequently, the third computer model 106 it's set up with the recorded architectural states obtained by implementing the first sequence of action inputs [$I_0$ . . . $I_k$] with the first computer model 102. Once the third computer model 106 it's set up with the recorded architectural states, the third computer model 106 implements the second sequence of action inputs [$I_a$, $I_b$] thereby resulting in second action outputs [$O_a$, $O_b$]. The third action outputs [$O_a$, $O_b$] and the second action outputs [$O_a$, $O_b$] are then compared to determine whether the hardware processing circuit design is FC. If the first action outputs [$O_a$, $O_b$] and the second action outputs [$O_a$, $O_b$] are the same, the hardware processing design is FC in accordance with some embodiments. If the first action outputs [$O_a$, $O_b$] and the second action outputs [$O_a$, $O_b$] are different, the hardware processing circuitry design is not FC in accordance with some embodiments.

In some embodiments, the action variable of the action input $I_a$ defines a non-interfering action that does not generate an observable output $O_a$. In other words, reading the output $O_a$ during the implementation of the computer models 104, 106 is not practical and therefore the output $O_a$ is not observable. Thus, the action input $I_b$ is provided which directly follows the action input $I_a$. The action input $I_b$ has an action variable that defines an interfering action where an input variable of the interfering action is the output $O_a$ of the action input $I_a$. In this manner, the output $O_a$ can be inferred from the output $O_b$. In this manner, the output $O_a$ can be checked for FC.

In this disclosure, when an action input does not result in an observable action output, the action input $I_a$ is referred to as not resulting in an action output. Thus, since the action output $O_a$ is not observable the action input $I_a$ is not considered to result in an action output. Instead the action output $O_a$ has to be inferred from the action output $O_b$. In some embodiments, the non-interfering action defined by the action input $I_a$ does not result in an action output such that implementing the second computer model 104 of the hardware processing circuit design on the action input $I_a$ does not result in any action output and implementing the third computer model 106 of the hardware processing design on the action input $I_a$ does not result in any action output since these action outputs $O_a$ are unobservable. For example, the non-interfering action of the action input $I_a$ can result in an update to at least one architectural state of at least one relevant state register in the hardware processing circuit design. As such, implementing the second computer model 104 on the action input $I_a$ does not result in an action output because the architectural state of the relevant state register is not observable during the implementation of the second computer model 104. As such, implementing the third computer model 106 on the action input $I_a$ does not result in an action output because the architectural state of the relevant state register is not observable during the implementation of the third computer model 106.

However as mentioned above, the interfering action (in other cases, a non-interfering action) of the action input $I_b$ results in an action output because the action output $O_b$ is observable. One of the variable inputs of the interfering action of the action input $I_b$ is the architectural state of the relevant state register updated by the action input $I_a$. Thus, implementing the action input $I_b$ by the second computer model 104 results in an observable action output $O_b$. Additionally, implementing the action input $I_b$ by the third computer model 106 results in an observable action output $O_b$. In this manner, the action output $O_a$ of the action input $I_a$ when implementing the second computer model 104 can be inferred from the observable action output $O_b$. Additionally, the action output $O_a$ of the action input $I_a$ when implementing the third computer model 106 can be inferred from the observable action output $O_b$. In this manner, the non observable action output $O_a$ resulting when implementing the second computer model 104 and the non observable action output $O_a$ resulting when implementing the third computer model 106 can be compared and checked for FC.

In some embodiments, operating the computer hardware processing circuit (HPC) computer models, inputs provided to each of the HPC computer models, and output generated by the HPC computer models in order to verify the HPC design as described in FIG. 1 has are referred to as G-QED. G-QED has the following advantages:

1. Thoroughness: G-QED is provably sound and complete.
2. Generality: G-QED is applicable for almost any digital design with the notion of architectural states, actions and idling.
3. High productivity: G-QED is orders of magnitude more productive than previously known techniques because writing the FC property doesn't rely on understanding the implementation details of the computer model unlike other previously known property based formal verification using BMC.

Figure 2:
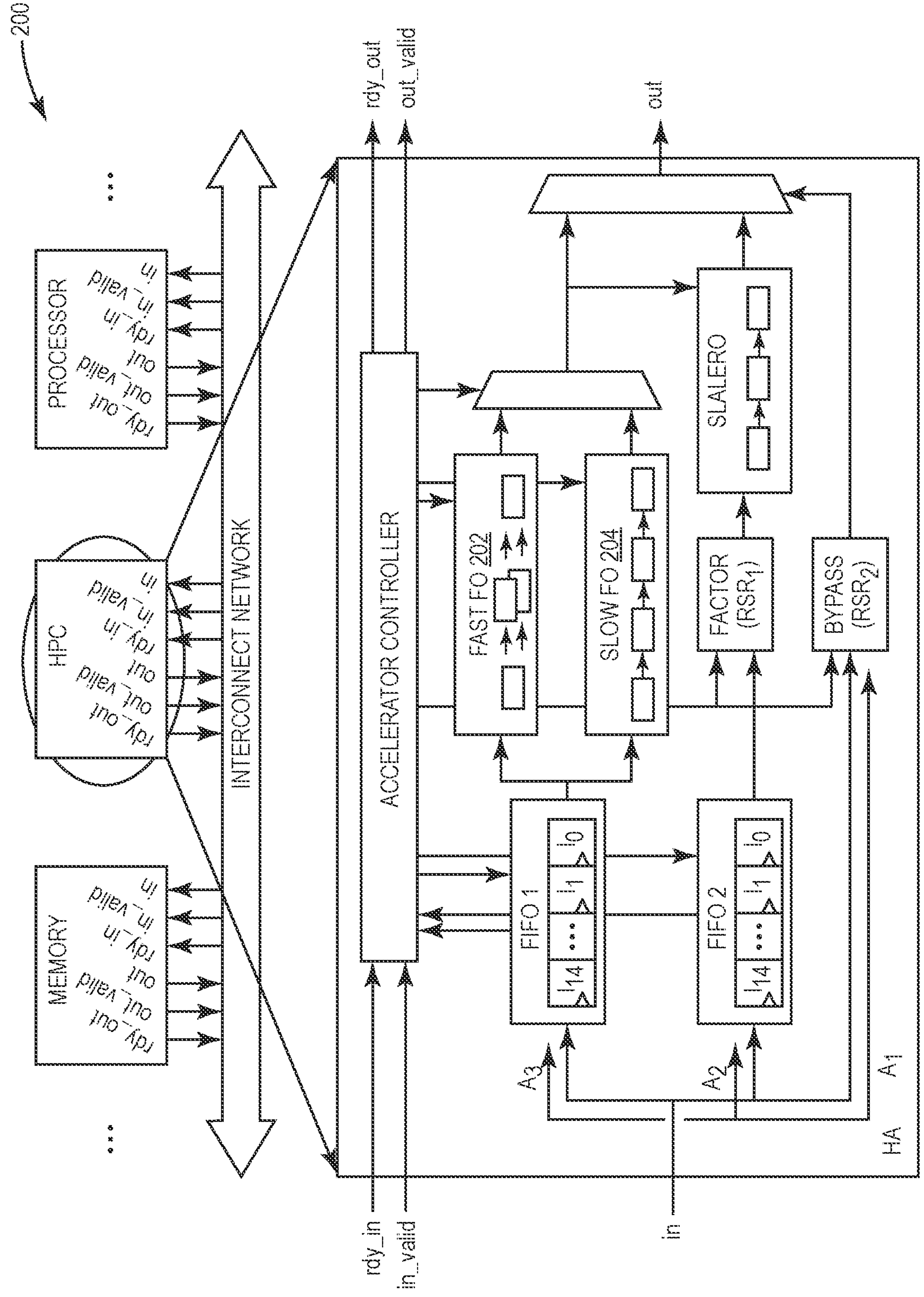
FIG. 2 illustrates a functional diagram of a computer model representing an HPC design, in accordance with some embodiments.

FIG. 2 illustrates a computer model 200 of a hardware processing circuit design, in accordance with some embodiments.

The computer model 200 represents an HPC (e.g., an HA). To ease the discussion, the modeled components of the computer model 200 are referred to in this disclosure with respect to the hardware components they represent. However, it should be understood that what is actually being discussed are computer models of the hardware components, and not the physical hardware components themselves. This eases the discussion of the hardware processing circuit design. By providing an example of an actual hardware processing circuit design being modeled by the computer model 200, the challenges overcome by the methodology discussed in FIG. 1 become clear and the advantages of the methodology implemented by the components of FIG. 1 become apparent. In one example, the first computer model 102, the second computer model 104, and the third computer model 106 are provided in accordance with the computer model 200. The computer model 200 is provided in the pre silicon environment to check for FC.

The HPC modeled by the computer model 200 is connected to other SoC components (e.g., processor, memory) via a handshake protocol similar to the one discussed in Singh et al., "A-QED Verification of Hardware Accelerators," in 57th ACM/IEEE Design Automation Conference, DAC 2020, San Francisco, CA, USA, Jul. 20-24, 2020. IEEE, 2020, pp. 1-6, which is hereby incorporated by reference in its entirety (hereinafter "Singh"). The HPC only reads valid inputs (in_valid asserted) from the network when it is ready (rdy_out asserted). The network reads HPC-generated outputs (out_valid asserted) when it is not blocked by other components (rdy_in asserted).

The HPC modeled by the computer model 200 and implements 3 actions $\{A_1, A_2, A_3\}$ as follows:

$A_1$(D): updates Bypass register with D. D is an independent data variable input that varies temporarily. Action $A_1$ is thus a non-interfering action.

$A_2$(D): updates Factor register with D. The independent variable for the action $A_2$ is stored in FIFO 2. Action $A_3$ is thus a non-interfering action.

$A_3$(D, Bypass, Factor): generates an output O=F(D) scaled by the Factor register value. The scaling operation is skipped depending on the Bypass register's value. The independent variable D for the action $A_3$ is stored in FIFO 1. The output of this interfering action $A_3$ depends not only on D, but also on the values of the Factor and Bypass registers. The Bypass and Factor registers constitute the Relevant State Registers (RSRs) of $A_3$.

The HPC modeled by the computer model 200 includes fast operational HA circuitry 202 and slow operational HA circuitry 204. F( ) and Scaler( ) take multiple cycles to compute and pending inputs are stored in the FIFOs. If neither FIFO is full, the HA utilizes the slow operational HA circuitry 204 to implement F( ). If either FIFO is full, the HA utilizes the fast operational HA circuitry 202 to implement F( ). If any of the Scaler( ) inputs is 0, the unit is designed to skip computation for better power and performance. Thus, when the Scaler( ) unit is bypassed, the HA updates Factor register with 0.

Consider the following bug (adapted from an actual bug)—the FIFO 1 full signal goes high only when the write pointer reaches 15 (starting from 0) but the FIFO can hold at most 15 entries. Hence, the 16th $A_3$ input overwrites its predecessor. This bug is only triggered if the rdy_in is low long enough. It can be detected by checking $A_3$ for FC. However, to perform FC, we need to constrain the relevant state registers (RSRs) (i.e., Bypass, Factor) to prevent false fails.

Challenge 1: The exact clock cycles when RSRs are read depend on the internal state and can be different for different RSRs. For example, consider action $A_3$. When the result of F( ) is fed to the Scaler( ) the value stored in Factor is also read. It is very important to precisely specify the clock cycle during which this value should be read. That is not an easy task because it depends on the latency of F( ) (which in turn depends on the FIFO 1 state). Incorrect timing information can result in false fails.

Challenge 2: Consider the same bug in FIFO 2. If we constrain Factor to a fixed value, $A_3$ will always read the same value from the Factor register and pass FC check.

Challenge 3: Checking FC on $A_2$ is a non-trivial problem since an update can happen either from $A_2$ or because the HA updates it to 0 when the Scaler( ) is bypassed. So it is not necessary that the $i^{th}$ action input will produce the $i^{th}$ update to the Factor register. Thus, we need to understand the design implementation to FIG. out when an action input updates the Factor register.

The FC approach described in FIG. 1 solves the three challenges. To check FC for the, the BMC runs the three computer models 102, 104, 106 from the reset state, which in this example are each provided as the computer model 200. The same first sequence of action inputs $[I_0 \ldots I_k]$ are implemented to the computer models 102, 104. The first computer models 102 of the HA is allowed to finish executing all the first sequence of action inputs $[I_0 \ldots I_k]$ and then the architectural states of the RSRs are saved. For the second computer model 104, the second sequence of action inputs $[I_a, I_b]$ is implemented directly following the first sequence of action inputs $[I_0 \ldots I_k]$. The action output pair $[O_a, O_b]$ are recorded. With regard to the third computer model 106, an action input sequence $[I_{m+1} \ldots I_n]$ (which is not is necessarily the same as $[I_0 \ldots I_k]$) is allowed to finish executing before sending the input pair Ia, h to the HA. The architectural states of the RSRs are saved before sending the second sequence of action inputs $[I_a, I_b]$ where the RSRs are constrained to be the same as the RSR values implemented by the first computer model 102. Additionally, the output pair action output pair $[O_a, O_b]$ resulting from the third computer model 106 is checked with that of the action output pair [$O_a$, $O_b$] of the second computer model 104. The FC property is formulated as:

RSR of the first computer model 102=RSR of the third computer model 106

Saved

{Oa, Ob} of the second computer model 104={Oa, Ob} of the third computer model 106

We assume that the RSRs values used to calculate {$O_a$, $O_b$} in of the second computer model 104 have the same values as those saved in of the first computer model 102. This is elucidated in the following design constraint: used the same recorded RSR values as the second computer model 104.

This is elucidated in the following design constraint:

If we send the input pair [$I_a$, $I_b$] after all the inputs have finished executing in the first computer model 102, then the output pair generated is the same as [$O_a$, $O_b$] in the second computer model 104. This means the output generated or the RSR updated by an action in a sequence is independent of how long the design is idle in between the inputs. The HA example in FIG. 2 is idling when the in_valid is low. During this time, no more inputs are accepted by the HA but previous inputs keep executing. We have seen this constraint to hold for all the designs tested. We avoid the Challenges 1 and 2 by constraining RSRs when no inputs are being executed.

With regards to challenge 3, the Factor value updated by $A_2$ can be propagated as an output of a future $A_3$ action. Thus, we address challenge 3 by FC for the action pair {$A_2$, $A_3$} instead of checking FC for $A_2$ action. Pair wise checking of actions allows us to find bugs in the RSR updating logic since checking the RSRs directly is non-trivial for a general HA as discussed in Challenge 3. However, this is not the case for processors, so we consider all the RSRs as the output of every instruction. Thus, we don't have to check instructions in pairs for processors but instead can check for a single output of a single action input.

To catch the FIFO 2 bug, BMC will run:

In the first computer model 102, an action input sequence such that 14 FIFO entries are filled. It will collect the RSRs after the action input sequence has finished executing.

In the second computer model 104 the v followed by $$I_{A2}^{15}, I_{A3}^{1}, \text{ and } I_{A2}^{16}\text{It}$$

and I}. Because of the bug, $$I_{A2}^{15}$$

will be overwritten and output will be $$F(I_{A3}^{1})\times I_{A2}^{16}.$$

In the third computer model 106 an input sequence such that the RSR values after it finishes execution, the RSRs values match that of the first computer model 102. Next, the BMC sends $$I_{A2}^{15}, I_{A3}^{1}$$

and the output will be $$F((I_{A3}^{1})\times I_{A2}^{15}$$

not equal to the output in the second computer model 104.

The bug in FIFO 1 can be caught in a similar manner.

Section IV of the appendix formalizes concepts discussed with respect to FIG. 1.

Figure 3:
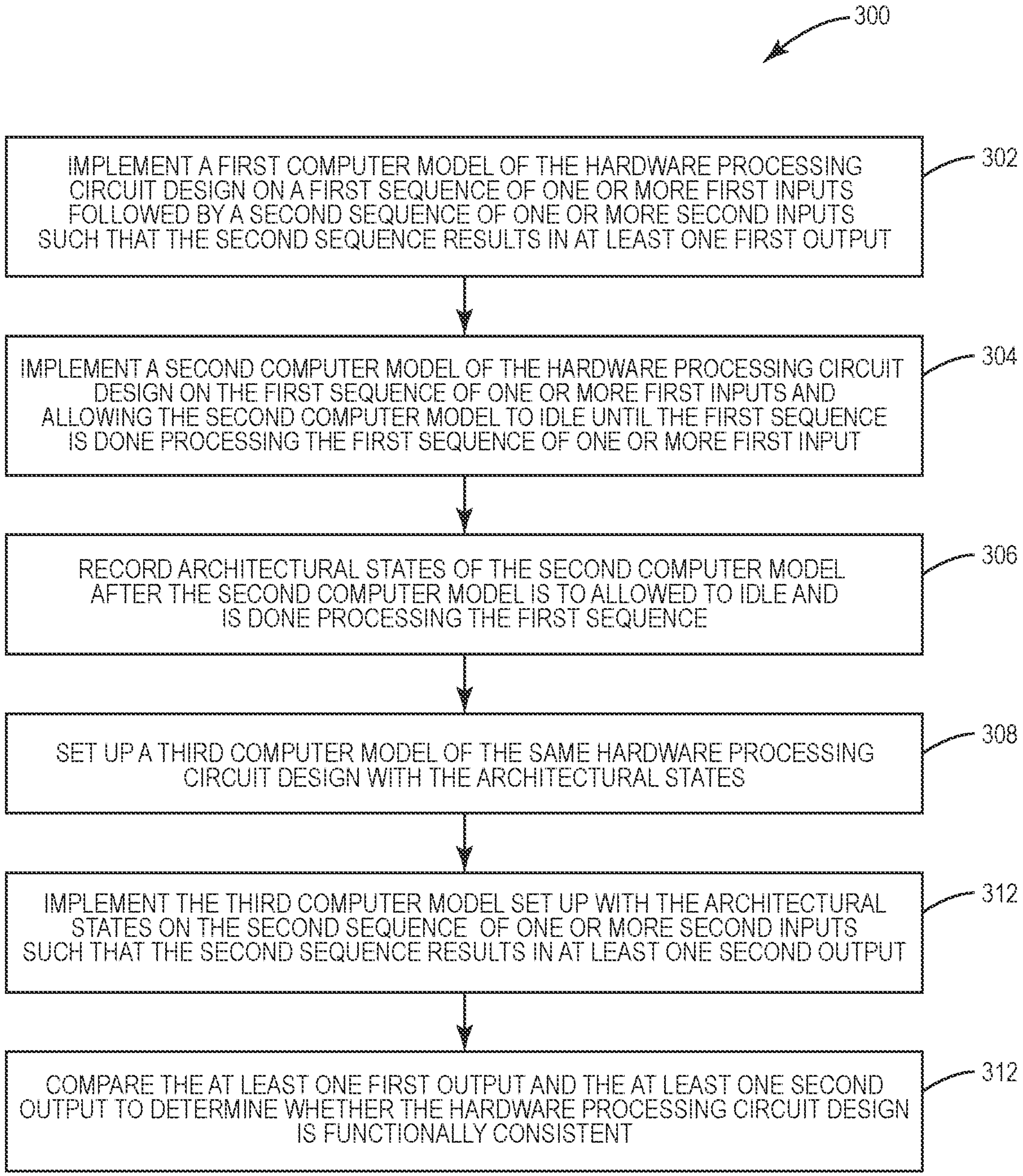
FIG. 3 is a flow chart of a method of verifying the hardware processing circuit design for a digital system, in accordance with some embodiments.

FIG. 3 is a flow chart 300 of a method of verifying the hardware processing circuit design for an SoC, in accordance with some embodiments.

Flow chart 300 includes procedures 302 to 312. In some embodiments, procedures 302 to 312 are performed by the components illustrated in FIG. 1. In some embodiments, the components illustrated in FIG. 1 are implemented by the processor-based system 400 shown in FIG. 4. Flow begins at procedure 302.

That procedure 302, a first computer model is implemented of a hardware processing circuit design on a first sequence of one or more first action inputs followed by a second sequence of one or more action inputs such that the second sequence results in at least one first action output. An example of the first computer model is the second computer model 104 shown in FIG. 1. An example of the hardware processing circuit design that may be modeled by the first computer model is shown by the computer model 200 in FIG. 2. The computer model 200 shown in FIG. 2 is a hardware accelerator design and in particular of an interfering hardware accelerator design. In some embodiments, the first computer model is of an RTL.

An example of the first sequence of one or more first action inputs is the first sequence of action inputs the first sequence of action inputs [$I_0 \ldots I_k$]. The exemplary first sequence of action inputs the first sequence of action inputs [$I_0 \ldots I_k$] has more than one action input. Each of the first action inputs in the first sequence has a first date available that varies for the first action inputs along the first sequence and the first action variable that varies for the first action inputs along the sequence. Some or all of the first action inputs along the first sequence may also define other variable inputs, including the architectural states of RSRs. The first action variable defines an action for the action input which varies along the first sequence of action inputs [$I_0 \ldots I_k$]. The data variable may be an independent variable that defines input data for each action input along the first sequence of action inputs [$I_0 \ldots I_k$].

An example of the second sequence of one or more action inputs is second sequence of action inputs [$I_a$, $I_b$]. The exemplary second sequence of action inputs has at least two action inputs $I_a$, $I_b$. Each of the second action inputs $I_a$, $I_b$ in the second sequence includes a data variable that varies for the second action inputs along the second sequence and a second action variable that varies along the second sequence. Some or all of the second action inputs along the second sequence may also define other variable inputs, including the architectural states of RSRs. For example, in some embodiments, the action input $I_a$ defines a non-interfering action that does not generate an observable output $O_a$. The action input $I_b$ defines an interfering action, wherein one of the variable inputs of the interfering action is the non observable output $O_a$ of the action input $I_a$. In this manner, the observable output $O_b$ of the action input $I_b$ is used to infer the non observable output $O_a$ of the action input $I_a$. Action outputs $[O_a, O_b]$ of the second computer model 104 are examples of the at least one first action output. In some embodiments, the sequence of action outputs includes a non observable action output and an observable action output in accordance with some embodiments. The non observable action output may be the result of a non-interfering action that updates the architectural state of at least one RSR. The observable action output maybe the result of an interfering action that utilizes the architectural state of the at least one RSR has one or more variable inputs. Flow then proceeds to procedure 304.

At procedure 304, a second computer model is implemented of the hardware processing circuit design on the first sequence of one or more first action inputs and allowing the second computer model to idle until the second computer model is done processing the first sequence of one or more action inputs. An example of the second computer model is the first computer model 102 shown in FIG. 1. An example of the hardware processing circuit design that may be modeled by the second computer model is shown by the computer model 200 in FIG. 2. The computer model 200 shown in FIG. 2 is a hardware accelerator design and in particular of an interfering hardware accelerator design. In some embodiments, the second computer model is of an RTL. Flow then proceeds to procedure 306.

At procedure 306, architectural states of the second computer model are recorded after the second computer model is allowed to idle and is done processing the first sequence. In some embodiments, the architectural states are the architectural states of RSRs of the hardware processing circuit design being modeled. Flow then proceeds to procedure 308.

At procedure 308, a third computer model of the same hardware processing circuit design is set up with the architectural states recorded in procedure 306. An example of the third computer model is the third computer model 106 shown in FIG. 1. An example of the hardware processing circuit design that may be modeled by the third computer model is shown by the computer model 200 in FIG. 2. The computer model 200 shown in FIG. 2 is a hardware accelerator design and in particular of an interfering hardware accelerator design. In some embodiments, the third computer model is of an RTL. Then proceeds to procedure 310.

At procedure 310, the third computer model set up with the architectural states is implemented on the second sequence of one or more action inputs such that the second sequence results in at least one second action output. An example of the at least one second action output is the sequence of action outputs $[O_a, O_b]$ a third computer model 106. In some embodiments, the sequence of action outputs includes a non observable action output and an observable action output in accordance with some embodiments. The non observable action output may be the result of a non-interfering action that updates the architectural state of at least one RSR. The observable action output maybe the result of an interfering action that utilizes the architectural state of the at least one RSR has one or more variable inputs. Flow then proceeds to procedure 312.

At procedure 312, the at least one first action output and the at least one second action output are compared to determine whether the hardware processing circuit design is functionally consistent. With respect to the exemplary non observable action output and observable action output discussed above with respect to procedures 302 and 312, performing procedure 312 includes comparing the first one of the at least one first action outputs and the second one of the at least one second action outputs to infer whether the first update to the at least one architectural state and the second update to the at least one architectural state are functionally consistent. In some embodiments, in order for the first update in the second update to be functionally consistent, the first update and the second update have to be the same.

In some embodiments, implementing the G-GED techniques described by the method in FIG. 3 have the following advantages:

1. Thoroughness: G-QED is provably sound and complete.
2. Generality: G-QED is applicable for almost any digital design with the notion of arch states, actions and idling.
3. High productivity: G-QED is orders of magnitude more productive than previously known techniques because writing the FC property doesn't rely on understanding the implementation details of the computer model unlike other previously known property based formal verification using BMC.

Figure 4:
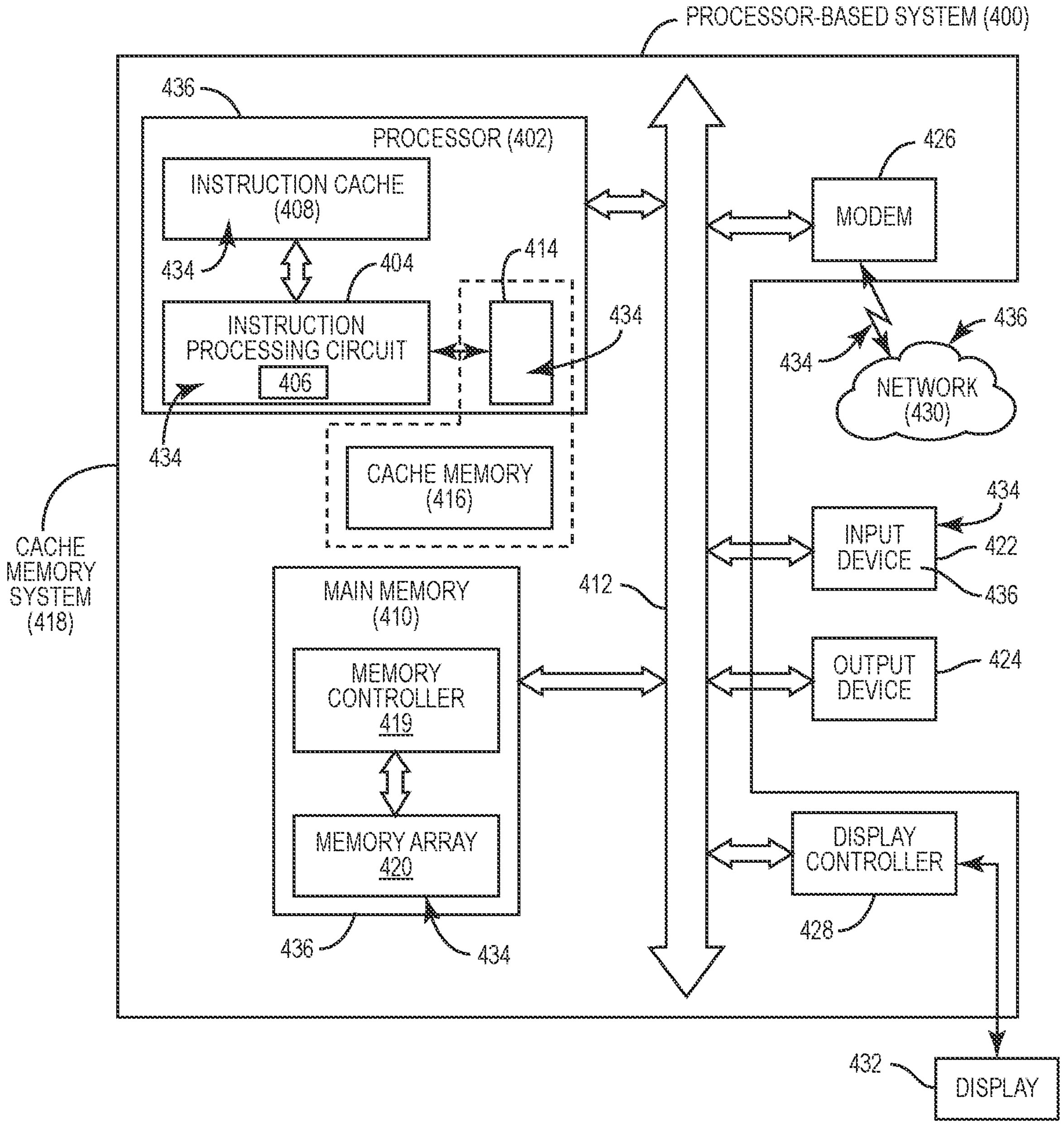
FIG. 4 is a block diagram of an exemplary processor-based system that includes a processor configured to execute computer instructions for execution.

FIG. 4 is a block diagram of an exemplary processor-based system 400 that includes a processor 402 configured to execute computer instructions for execution.

The processor-based system also includes a memory system 404 that includes one or more memory arrays that each include multiple memory banks and include an integrated serialization circuit configured to convert parallel data streams of read data received from separately switched memory banks into a single, serialized, read data stream to be provided on the output bus in a burst read mode, and/or a de-serialization circuit configured to convert a received, serialized write data stream on an input bus for a write operation into separate, parallel write data streams to be written simultaneously to the memory banks in a burst write mode. The memory system 404 in this example includes an instruction cache 406, a data cache 408, and a system memory 410.

With continuing reference to FIG. 4, the processor-based system 400 (i.e., computer system 400) may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer. The processor 402 represents one or more general-purpose processing circuits, such as a microprocessor, central processing unit, or the like. The processor 402 includes an instruction processing circuit 409 configured to execute processing logic in computer instructions for performing the operations and steps discussed herein. The processor 402 also includes the instruction cache 406 for temporary, fast access memory storage of instructions. Fetched or prefetched instructions from a memory, such as from a system memory 410 over a system bus 412, are stored in the instruction cache 406. The processor 402 also includes a data cache 408 for temporary, fast access memory storage of data from the system memory 410 over the system bus 412.

The processor 402 and the system memory 410 are coupled to the system bus 412 and can intercouple peripheral devices included in the processor-based system 400. As is well known, the processor 402 communicates with these other devices by exchanging address, control, and data information over the system bus 412. For example, the processor 402 can communicate bus transaction requests to a memory controller 414 in the system memory 410 as an example of a slave device. Although not illustrated in FIG. 4, multiple system buses 412 could be provided, wherein each system bus constitutes a different fabric. In this example, the memory controller 414 is configured to provide memory access requests to a memory array 416 in the system memory 410. The memory array 416 is comprised of an array of storage bit cells for storing data. The system memory 410 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 412. As illustrated in FIG. 4, these devices can include the system memory 410, one or more input device(s) 418, one or more output device(s) 420, a modem 422, and one or more display controllers 424, as examples. The input device(s) 418 can include any type of input device, including but not limited to input keys, switches, voice processors, etc. The output device(s) 420 can include any type of output device, including but not limited to audio, video, other visual indicators, etc. The modem 422 can be any device configured to allow the exchange of data to and from a network 426. The network 426 can be any type of network, including but not limited to a wired or wireless network, a private or public network, a local area network (LAN), a wireless local area network (WLAN), a wide area network (WAN), a BLUETOOTH™ network, and the Internet. The modem 422 can be configured to support any type of communications protocol desired. The processor 402 may also be configured to access the display controller(s) 424 over the system bus 412 to control information sent to one or more displays 428. The display(s) 428 can include any type of display, including but not limited to a cathode ray tube (CRT), a liquid crystal display (LCD), a plasma display, etc.

The processor-based system 400 in FIG. 4 may include a set of instructions 430 that when executed by a processor, such as processor 402, perform serialization of read data from the memory system 404 by converting parallel data streams of read data received from separately switched memory banks into a single, serialized, read data stream to be provided on the output bus in a burst read mode, and/or perform de-serialization of write data communicated to the memory system 404 to be written by converting a received, serialized write data stream on an input bus for a write operation into separate, parallel write data streams to be written simultaneously to the memory banks in a burst write mode. The instructions 430 may be stored in the system memory 410, processor 402, and/or instruction cache 406 as examples of non-transitory computer-readable medium 432. The instructions 430 may also reside, completely or at least partially, within the system memory 410 and/or within the processor 402 during their execution. The instructions 430 may further be transmitted or received over the network 426 via the modem 422, such that the network 426 includes the non-transitory computer-readable medium 432, or the input device 418 as other examples.

While the non-transitory computer-readable medium 432 is shown in an exemplary aspect to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the aspects disclosed herein. The term "computer-readable medium" shall accordingly be taken to include, but not be limited to, solid-state memories, optical medium, and magnetic medium.

In some aspects, in response to executing the computer executable instructions stored in the computer readable medium 432, the processor 402 is configured to perform the methodology described with respect to FIG. 1. For instance, the processor executes the first computer model 102 the second computer model 104 and the third computer model 106 as described above with respect to FIG. 1. As such, in response to executing the computer executable instructions stored in the computer readable medium 432, the processor is configured to perform the flow chart 300 shown in FIG. 4. These and other embodiments of the method are within the scope of this disclosure.

APPENDIX

The aspects disclosed herein include various steps. The steps of the aspects disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The aspects disclosed herein may be provided as a computer program product, or software, that may include a machine-readable medium (or computer-readable medium) having stored thereon instructions, which may be used to program a computer system (or other electronic devices) to perform a process according to the aspects disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

What is claimed is:

1. A method of verifying a hardware processing circuit design for a system on chip (SoC), comprising:

implementing a first computer model of the hardware processing circuit design on a first sequence of one or more first inputs followed by a second sequence of one or more second inputs such that the second sequence results in at least one first output;

implementing a second computer model of the hardware processing circuit design on the first sequence of the one or more first inputs and allowing the second computer model to idle until the first sequence is done processing the first sequence of the one or more first inputs;

recording architectural states of the second computer model after the second computer model is to allowed to idle and is done processing the first sequence;

setting up a third computer model of the hardware processing circuit design with the architectural states;

implementing the third computer model with the architectural states on the second sequence of the one or more second inputs such that the second sequence results in at least one second output; and comparing the at least one first output and the at least one second output to determine whether the hardware processing circuit design is functionally consistent.

2. The method of claim 1, wherein:

the first sequence of the one or more first inputs comprises more than one of the one or more first inputs, each of the one or more first inputs in the first sequence comprises a first data variable that varies for the first inputs along the first sequence and a first action variable that varies for the first inputs along the first sequence; and the second sequence of the one or more second inputs comprises at least two second inputs, each of the at least two second inputs in the second sequence comprises a second data variable that varies for the second inputs along the second sequence and a second action variable that varies along the second sequence.

3. The method of claim 2, wherein:

the second action variable of a first one of the second inputs defines a non-interfering action and the second action variable of a second one of the second inputs defines an interfering action, the first one of the second inputs is provided in the second sequence immediately before the second one of the second inputs.

4. The method of claim 3, wherein:

the non-interfering action of the first one of the second inputs does not result in an output such that implementing the first computer model of the hardware processing circuit design on the first one of the second inputs does not result in any of the at least one first output and implementing the third computer model of the hardware processing circuit design on the first one of the second inputs does not result in any of the at least one second output;

the non-interfering action of the first one of the second inputs results in an update to at least one architectural state of at least one of relevant state register in the hardware processing circuit design such that implementing the first computer model of the hardware processing circuit design on the first one of the second inputs results in a first update to the at least one architectural state of the at least one of relevant state register and implementing the third computer model of the hardware processing circuit design on the first one of the second inputs results in a second update to the at least one architectural state of the at least one of relevant state register; and the interfering action of the second one of the second inputs results in an output, wherein the at least one architectural state of the at least one of relevant state register is a variable input to the interfering action, wherein implementing the first computer model of the hardware processing circuit design on the second one of the second inputs results in a first one of the at least one first output and implementing the third computer model of the hardware processing circuit design on the second one of the second inputs results in a second one of the at least one second output.

5. The method of claim 4, wherein comparing the at least one first output and the at least one second output to determine whether the hardware processing circuit design is functionally consistent comprises comparing the first one of the at least one first output and the second one of the at least one second output to infer whether the first update to the at least one architectural state of the at least one of relevant state register and the second update to the at least one architectural state of the at least one of relevant state register are functionally consistent.

6. The method of claim 5, wherein determining whether the first update to the at least one architectural state of the at least one of relevant state register and the second update to the at least one architectural state of the at least one of relevant state register are functionally consistent comprises determining whether the first update of the at least one architectural state of the at least one of relevant state register and the second update to the at least one architectural state of the at least one of relevant state register are the same.

7. The method of claim 1, wherein the hardware processing circuit design is of a hardware accelerator design.

8. The method of claim 7, wherein the hardware accelerator design comprises an interfering hardware accelerator design.

9. The method of claim 1, wherein:

the first computer model is a first register transfer level (RTL) of the hardware processing circuit design;

the second computer model is a second RTL of the hardware processing circuit design; and the third computer model is a third RTL of the hardware processing circuit design.

10. The method of claim 1, wherein the first computer model, the second computer model, and the third computer model are identical.

11. A computer system for verifying a hardware processing circuit design for a system on chip (SoC), comprising:

one or more processors; and a non transitory computer readable medium that stores computer executable instructions, wherein, in response to the one or more processors executing the computer executable instructions, the one or more processors are configured to:

implement a first computer model of the hardware processing circuit design on a first sequence of one or more first inputs followed by a second sequence of one or more second inputs such that the second sequence results in at least one first output;

implement a second computer model of the hardware processing circuit design on the first sequence of the one or more first inputs and allowing the second computer model to idle until the first sequence is done processing the first sequence of the one or more first inputs;

record architectural states of the second computer model after the second computer model is to allowed to idle and is done processing the first sequence;

set up a third computer model of the hardware processing circuit design with the architectural states;

implement the third computer model set up with the architectural states on the second sequence of the one or more second inputs such that the second sequence results in at least one second output; and compare the at least one first output and the at least one second output to determine whether the hardware processing circuit design is functionally consistent.

12. The computer system of claim 11, wherein:

the first sequence of the one or more first inputs comprises more than one of the one or more first inputs, each of the one or more first inputs in the first sequence comprises a first data variable that varies for the first inputs along the first sequence and a first action variable that varies for the first inputs along the first sequence; and the second sequence of the one or more second inputs comprises at least two second inputs, each of the at least two second inputs in the second sequence comprises a second data variable that varies for the second inputs along the second sequence and a second action variable that varies along the second sequence.

13. The computer system of claim 12, wherein:

the second action variable of a first one of the second inputs defines a non-interfering action and the second action variable of a second one of the second inputs defines an interfering action, the first one of the second inputs is provided in the second sequence immediately before the second one of the second inputs.

14. The computer system of claim 13, wherein:

the non-interfering action of the first one of the second inputs does not result in an output such that implementing the first computer model of the hardware processing circuit design on the first one of the second inputs does not result in any of the at least one first output and implementing the third computer model of the hardware processing circuit design on the first one of the second inputs does not result in any of the at least one second output;

the non-interfering action of the first one of the second inputs results in an update to at least one architectural state of at least one of relevant state register in the hardware processing circuit design such that implementing the first computer model of the hardware processing circuit design on the first one of the second inputs results in a first update to the at least one architectural state of the at least one of relevant state register and implementing the third computer model of the hardware processing circuit design on the first one of the second inputs results in a second update to the at least one architectural state of the at least one of relevant state register; and the interfering action of the second one of the second inputs results in an output, wherein the at least one architectural state of the at least one of relevant state register is a variable input to the interfering action, wherein implementing the first computer model of the hardware processing circuit design on the second one of the second inputs results in a first one of the at least one first output and implementing the third computer model of the hardware processing circuit design on the second one of the second inputs results in a second one of the at least one second output.

15. The computer system of claim 14, wherein, in response to executing the computer executable instructions, the one or more processors are configured to compare the at least one first output and the at least one second output to determine whether the hardware processing circuit design is functionally consistent by comparing the first one of the at least one first output and the second one of the at least one second output to infer whether the first update to the at least one architectural state of the at least one of relevant state register and the second update to the at least one architectural state of the at least one of relevant state register are functionally consistent.

16. The computer system of claim 15, wherein, in response to executing the computer executable instructions, the one or more processors are configured to determine whether the first update to the at least one architectural state of the at least one of relevant state register and the second update to the at least one architectural state of the at least one of relevant state register are functionally consistent by determining whether the first update of the at least one architectural state of the at least one of relevant state register and the second update to the at least one architectural state of the at least one of relevant state register are the same.

17. The computer system of claim 11, wherein the hardware processing circuit design is of a hardware accelerator design.

18. The computer system of claim 17, wherein the hardware accelerator design comprises an interfering hardware accelerator design.

19. The computer system of claim 11, wherein:

the first computer model is a first register transfer level (RTL) of the hardware processing circuit design;

the second computer model is a second RTL of the hardware processing circuit design; and the third computer model is a third RTL of the hardware processing circuit design.

20. The computer system of claim 11, wherein the first computer model, the second computer model, and the third computer model are identical.

* * * * *